United States Patent [19]
Greenwood

[11] Patent Number: 4,813,675
[45] Date of Patent: Mar. 21, 1989

[54] RECONFIGURABLE CASINO TABLE GAME AND GAMING MACHINE TABLE

[75] Inventor: Nick E. Greenwood, Reno, Nev.

[73] Assignee: Bally Manufacturing Corporation, Chicago, Ill.

[21] Appl. No.: 164,608

[22] Filed: Mar. 7, 1988

[51] Int. Cl.[4] .............................................. A63F 9/22
[52] U.S. Cl. .................... 273/138 A; 108/11; 273/309
[58] Field of Search ............. 273/138 A, 85 CP, 309; 108/11, 13

[56] References Cited

U.S. PATENT DOCUMENTS

| D. 223,265 | 4/1972 | Wolf | 273/309 X |
|---|---|---|---|
| 919,708 | 4/1909 | Faulkner | 273/309 |
| 1,886,806 | 11/1932 | Hanley | 273/309 X |
| 3,001,843 | 9/1961 | Davis | 273/309 X |
| 4,614,342 | 9/1986 | Takashima | 273/138 A X |

Primary Examiner—Anton O. Oechsle
Attorney, Agent, or Firm—Jenner & Block

[57] ABSTRACT

To increase casino floor space utilization, an enclosure containing a number of video gaming machines is constructed such that it can readily be converted to a casino table game. This is accomplished by configuring the top of the enclosure to receive a standard table game board. The enclosure also includes a game display module that can easily be replaced by a dealer chip tray when the enclosure is converted to a table game.

25 Claims, 3 Drawing Sheets

FIG. 5
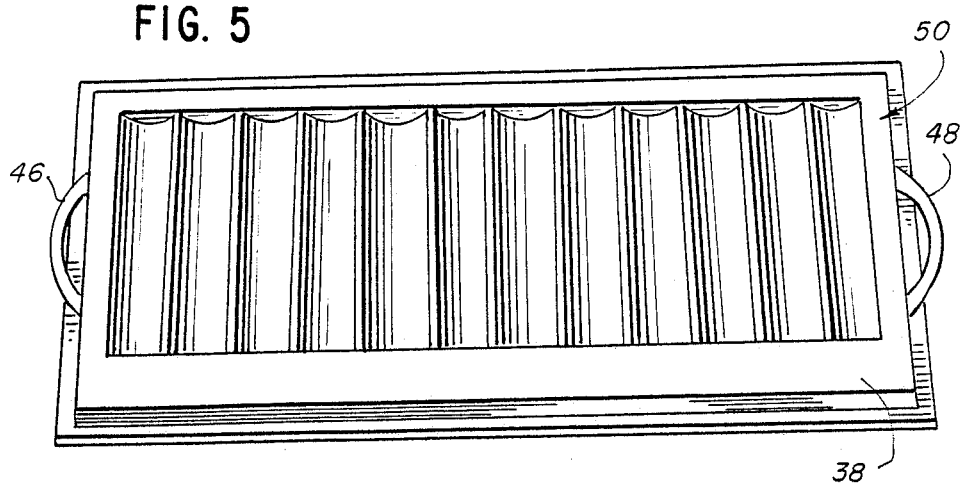
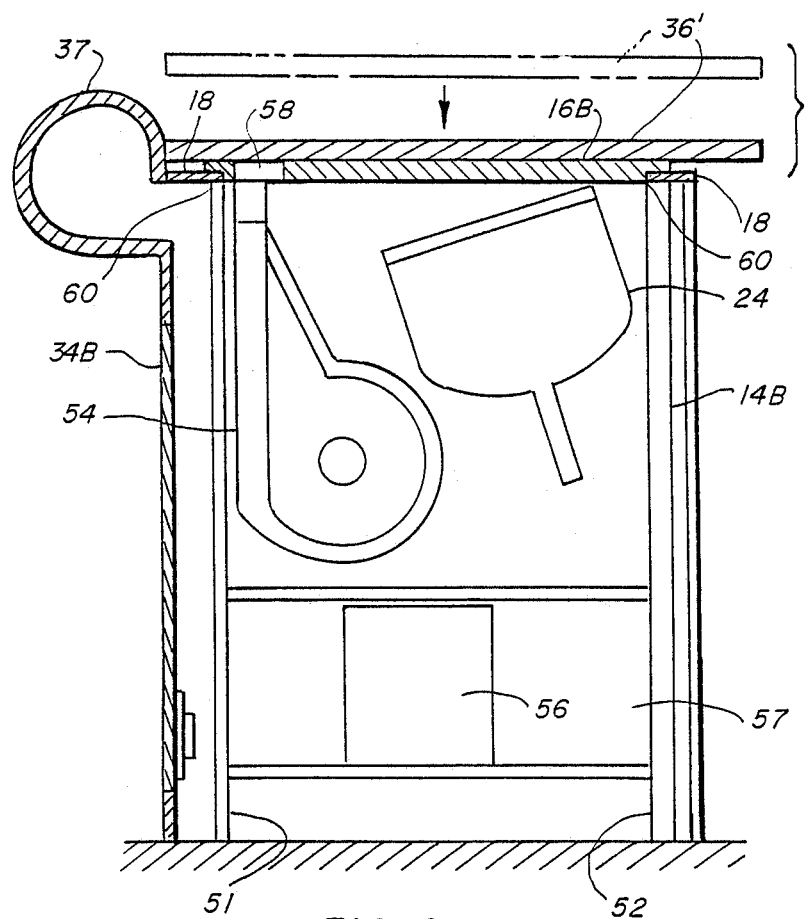
FIG. 6

RECONFIGURABLE CASINO TABLE GAME AND GAMING MACHINE TABLE

TECHNICAL FIELD

The invention relates to the field of casino gaming equipment and more particularly to casino gaming tables.

BACKGROUND OF THE INVENTION

In most casinos, floor space is at a premium. It is the desire of casino management therefore to make the most efficient use of the space available in order to maximize revenue to the casino.

This objective is complicated by the fact that the demand for certain table games such as the card game 21 or Blackjack tends to be seasonal in nature. It has been a common casino practice to provide sufficient tables for these games to accommodate peak customer demand which may only occur two or three times a year. The result of this practice has been that a number of such tables stand idle much of the time taking up valuable floor space.

SUMMARY OF THE INVENTION

It is therefore an object of the invention to provide a casino game table that is readily convertible into a structure containing several video gaming machines.

It is an additional object of the invention to provide a convertible casino gaming structure that includes three video gaming machines in a housing with the video displays and game controls extending through the top surface of the housing. The top surface is then configured such that a standard table game board can be placed over the video displays and game controls. The video gaming machines are arranged internally with a coin mechanism located in front of a display monitor such that the width of the video gaming machines, preferably about 18 inches, is sufficiently narrow so that the structure can accommodate a standard table game board.

It is a further object of the invention to provide a casino gaming structure that includes several bar top type video gaming machines and a game display module for displaying information relating to the video gaming machines where a standard table game board can be secured over the video gaming machines. Provision is also made for replacing the display module with a dealer chip tray when the table game board is secured over the video gaming machines.

BRIEF DESCRIPTION OF THE DRAWINGS

FIG. 5 is a top view of the dealer chip tray shown in FIG. 2; and

FIG. 6 is a sectioned view of FIG. 1 taken along section lines 6—6 in FIG 2.

DETAILED DESCRIPTION OF THE INVENTION

Figure 1:
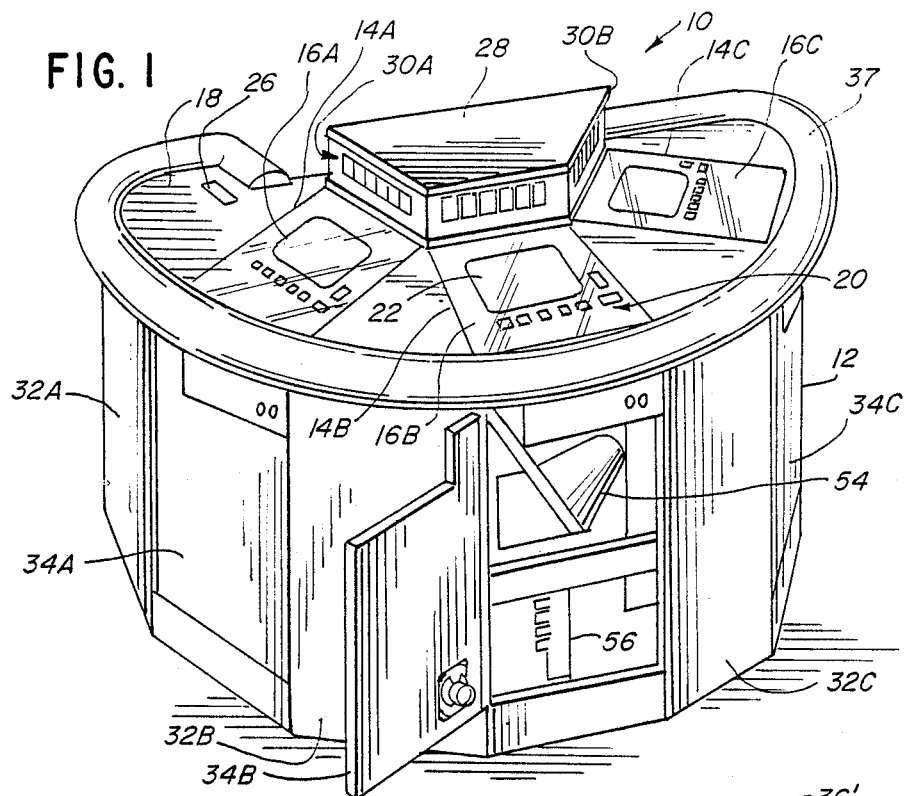
FIG. 1 is a perspective view of a reconfigurable gaming table in a video gaming machine mode.

Indicated generally at 10 in FIG. 1 is a perspective view of a reconfigurable gaming table shown in a video gaming machine mode. Included within a table housing 12 are three coin operated video gaming machines 14A, 14B and 14C. The gaming machines 14A-14C are spaced at approximately equal angles within the housing. In the preferred embodiment of the invention shown in FIG. 1, the gaming machines 14A-14C electronically simulate and permit players to individually play the table card game 21 or Blackjack. Each of the gaming machines 14A-14C includes a bezel 16A, 16B and 16C secured over a top surface 18 of the table 10. The gaming machines 16A-16C extend through apertures in the top surface 18 as shown in FIG. 6. As can be seen in better detail in FIG. 4, each bezel 16A-16C includes a number of game control buttons indicated generally at 20 and a display window 22 through which the video game display, generated on a display monitor 24 shown in FIG. 6, can be viewed.

Also, the top surface 18 includes a bill slot 26, which is in communication with a locked cash box (not shown) attached to the underside of the top surface 18, that is used by a dealer when the table 10 is configured in the table game mode. A display module 28, that includes three groups of video game display indicators 30A, 30B and 30C associated with the three video gaming machines 14A-14C, respectively, is seated on the top surface 10. The display module 28 is electrically connected to the gaming machines 14A-14C.

As can be seen in FIG. 1, the table housing or enclosure 12 is generally semicircular in shape and is composed of a number of planar panels including 32A-32C and three door panels 34A-34C. Door panel 34B is shown in an open position in FIG. 1 and closed in FIG. 2.

Figure 2:
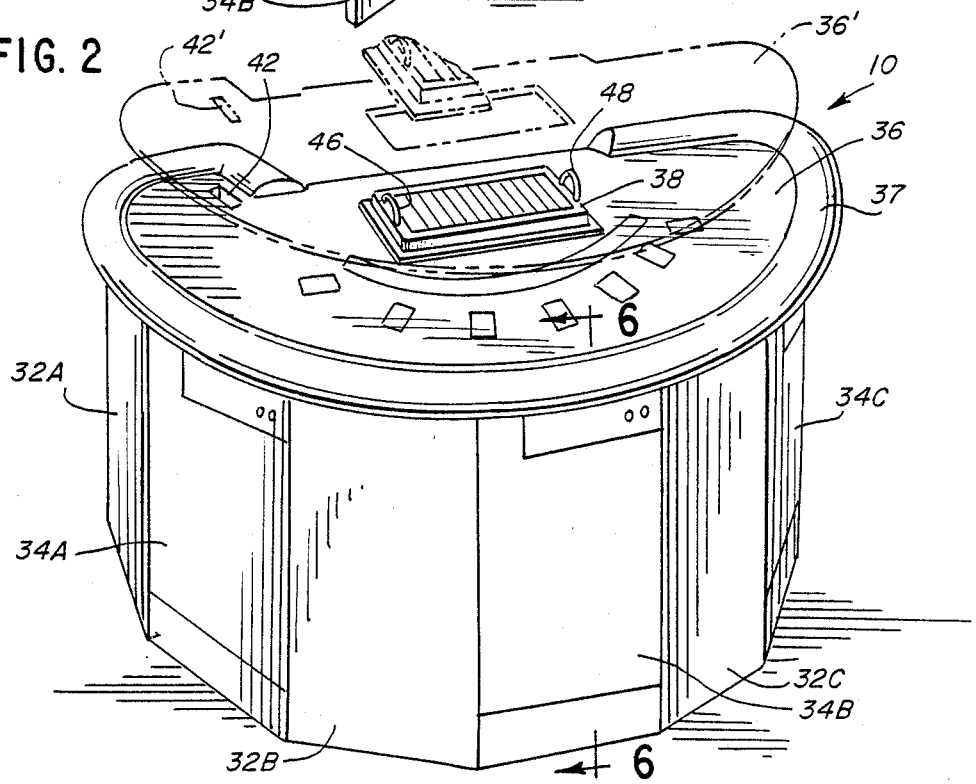
FIG. 2 is a perspective view of the gaming table of FIG. 1 in a table game mode.

The table 10 is shown in FIG. 2 in the table game mode. Placed over the top surface 18 is a table game board 36 which conforms in shape to the top surface 18. The board 36 is retained in place by a resilient roll-shaped material 37 extending around the periphery of the top surface 18 and attached to the top surface 18 and the housing 12. This material 37 serves the dual purpose of protecting the players from the edge where the top of the housing 12 meets top surface 18 and holding the game board 36 in position. For purposes of illustration the table game board 36 is shown in dashed lines at 36' in FIG. 2 above the table 10 to demonstrate how the board 36 is dropped down over the top surface 18 and the video gaming machines 16A-16C in order to convert the table from the video gaming machine mode to the table game mode. Prior to placing the board 36 on the top surface 18, the display module 28 is removed and replaced by a dealer chip tray 38 after the board is in place on the table 10.

Figure 3:
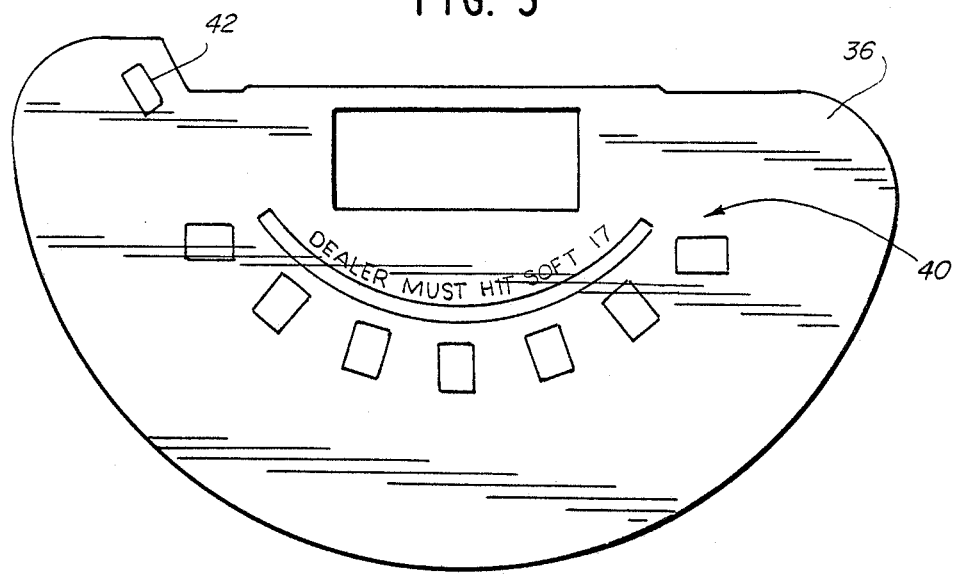
FIG. 3 is a top view of the table game board shown in FIG. 2.

FIG. 3 provides a top view of the table game board showing the board 36 with a set of conventional markings 40 for the card game 21 or Blackjack. Additionally, the board includes a bill slot 42 through which the dealer can insert bills into the cash box. When the board 36 is in place on the table 10, the slot 42 will be aligned with the slot 26 in the top surface 18. It is conventional practice in casinos for dealers to place currency bills in a locked cash box while operating a table game.

Figure 4:
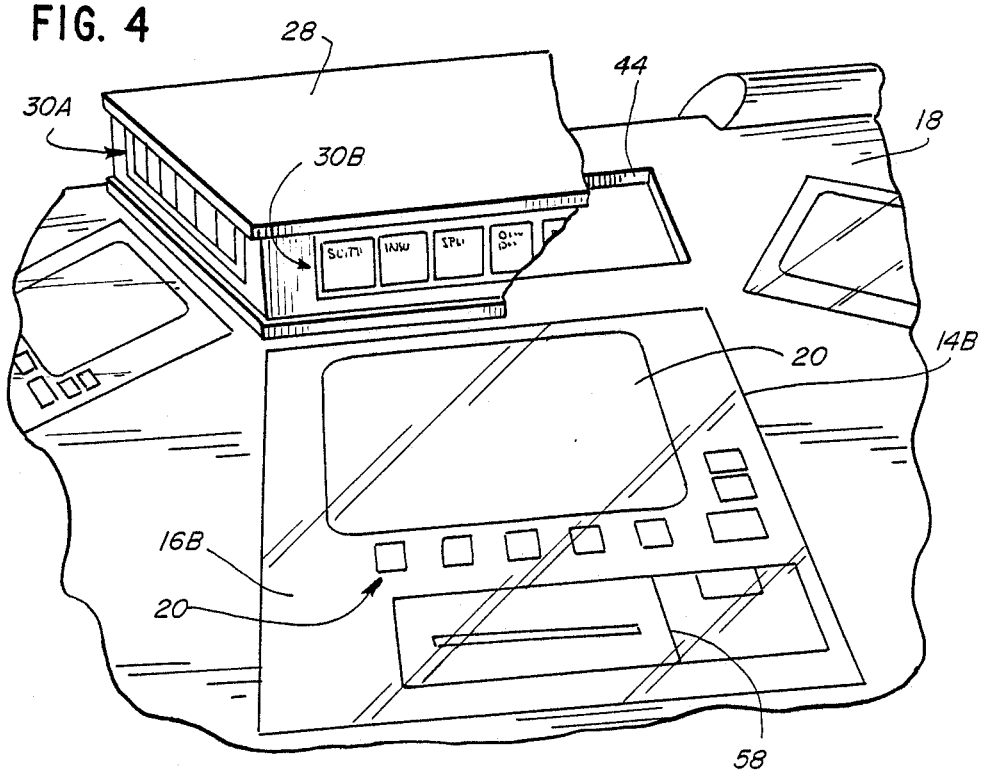
FIG. 4 is a partially broken away view of a portion of FIG. 1.

In order to facilitate the replacement of the display module 28 with the chip tray 38, the top surface 18 as shown in FIG. 4 includes a rectangularly shaped aperture 44 in which both the display module 28 and the chip tray 38 can be seated. Also to aid in placement and removal, the chip tray 38 is provided with a pair of handles 46 and 48 as illustrated in FIG. 5. The tray 38 additionally includes a number of grooves indicated generally at 50 to hold the dealer's chips or coins. To facilitate conversion, the display module 28 is electrically connected by a set of readily detachable connectors (not shown) to the gaming machines 14A-14C.

Because the size of table game tables are often regulated by state or gaming commission regulations, the size of the table and hence the size of video gaming machines that can be placed in the type of reconfigurable arrangement 10 shown in FIGS. 1 and 2 are limited. As a practical matter it has been discovered that to create this structure 10, the width of the preferred embodiment of the gaming machines 14A-14C should not be much larger than 18 inches with the width of the bezels 16A-16C limited to about 20 inches.

Therefore, in the preferred embodiment of the invention, an internal video gaming machine arrangement of the type illustrated in simplified form in both FIG. 6 and FIG. 1 is desirable. The internal components of the gaming machines 14A-14C are supported by a frame represented by a pair of support elements 51 and 52. The depth of the frame or distance between support elements 51 and 52 is preferably about 16 inches. Here, as shown in FIG. 6 the display monitor 24 is positioned behind a coin drive mechanism 54. This arrangement differs from most video gaming machines where the coin mechanism is located alongside the display monitor which results in a gaming machine that is too wide. However, as is conventional in gaming machines of this type, a set of electronics 56 is located in a lower portion 57 of the game machine 14B. The coin mechanism 54 is operatively associated with a coin trough 58 in the bezel 16B. In FIG. 6 is shown an aperture 60 in top surface 18 through which the video gaming machine 14B extends. As illustrated in FIG. 6, a portion of the bezel 16B extends over the top surface 18.

It will thus be appreciated that the table structure 10 shown in FIGS. 1-6 provides casino gaming equipment that can quickly and easily be converted or reconfigured from one type of gaming operation to another with a concomitant increase in efficient floor space utilization.

What is claimed is:

1. A reconfigurable casino gaming structure comprising:
   a housing including a top surface configured with a plurality of display apertures;
   a plurality of video gaming machines each having a display and control elements secured within said housing such that said display and control elements extend through said display apertures; and
   a planar game play member configured in substantially the same shape as said top surface removably disposed to said top surface over said display and control elements.

2. The structure of claim 1 wherein said housing is generally semicircular in configuration and there are three of said video gaming machines which are substantially equally angularly displaced from one another within said housing.

3. The structure of claim 2 additionally including a chip tray removably disposed to said game play member.

4. The structure of claim 3 wherein said top surface includes a receiving aperture for receiving said chip tray.

5. The structure of claim 2 additionally including a game display module removably disposed to said top surface and operatively connected to said gaming machines.

6. The structure of claim 5 wherein said top surface includes a receiving aperture for receiving said display module.

7. The structure of claim 6 wherein said game play member is configured with an aperture that is aligned with said receiving aperture when said game play member is disposed to said top surface effective to receive a chip tray when said game play member is disposed to said top surface.

8. The structure of claim 2 wherein said video gaming machines include:
   a frame;
   a display monitor secured within the rear portion of said frame; and
   a coin mechanism secured within, said frame substantially in front of said display monitor.

9. The structure of claim 8 wherein said frame is 18 inches in width.

10. The structure of claim 9 wherein said frame has a depth of approximately 16 inches.

11. The structure of claim 8 wherein each of said video gaming machines additionally includes a bezel member secured to the top of said frame and extending over a portion of said top surface.

12. The structure of claim 11 wherein said bezel member has a width of approximately 20 inches.

13. The structure of claim 1 additionally including a game display module disposed to said top surface and releasably operatively connected to said video gaming machines.

14. The structure of claim 13 wherein said top surface includes a receiving aperture for receiving said display module.

15. The structure of claim 14 wherein said receiving aperture is configured to receive a chip tray when said display module is removed from said top surface.

16. The structure of claim 1 wherein said video gaming machines have a width of 18 inches.

17. The structure of claim 16 wherein said video gaming machines include a bezel member secured to the top of said video gaming machines and extending over a portion of said top surface.

18. The structure of claim 17 wherein said bezel member has a width of 20 inches.

19. The structure of claim 16 wherein said video gaming machines include a display monitor secured within a rear portion of said frame and a coin drive mechanism wherein said coin drive mechanism is secured within said frame substantially in front of said display monitor.

20. The structure of claim 19 wherein said frame has a depth of approximately 16 inches.

21. The structure of claim 1 wherein said housing additionally includes a positioning member secured to at least a portion of the outer periphery of said top surface effective to positionally retain said game play member.

22. The structure of claim 1 wherein said top surface is configured with a first bill slot and said game play member is configured with a second bill slot such that said first and second bill slots are aligned when said game play member is disposed to said top surface.

23. A reconfigurable casino gaming structure comprising:
  a housing including a plurality of video gaming machines; and
  converting means for converting said housing into a table-game table.

24. The structure of claim 23 wherein said housing includes a detachable display module connected to said video gaming machines.

25. The structure of claim 24 wherein said converting means includes a chip tray adapted to replace said display module when said structure is converted into said table game.

* * * * *